G. J. SPOHRER.
VEHICLE DUMPING AND JACKING MEANS.
APPLICATION FILED AUG. 24, 1920.
1,414,835.
Patented May 2, 1922.
2 SHEETS—SHEET 1.
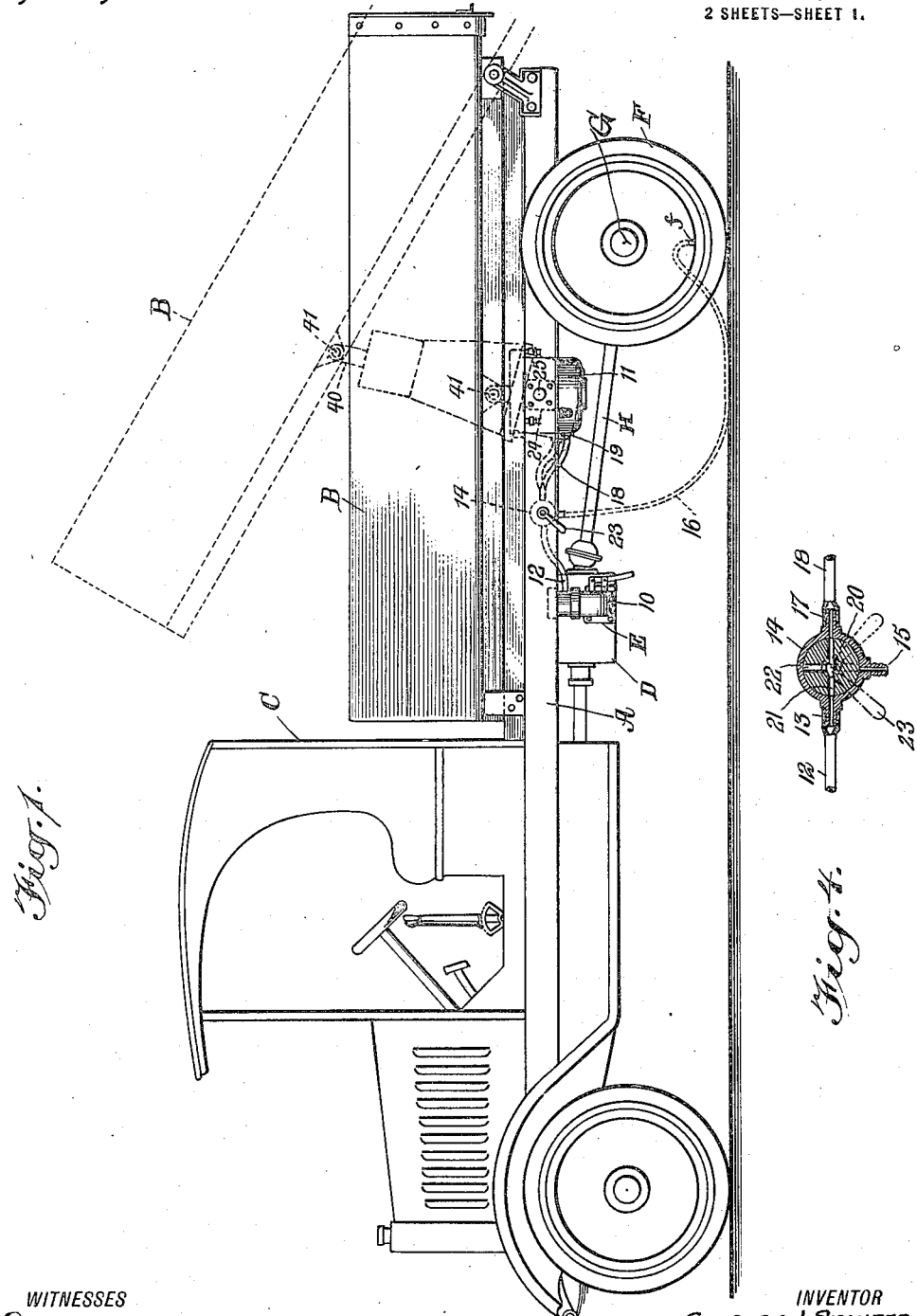
WITNESSES
INVENTOR
GREGORY J. SPOHRER
BY
ATTORNEYS

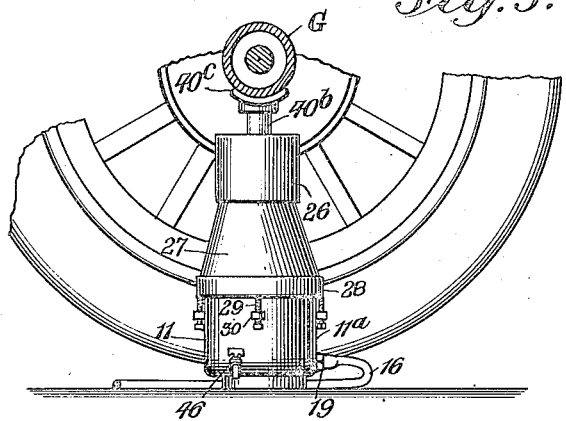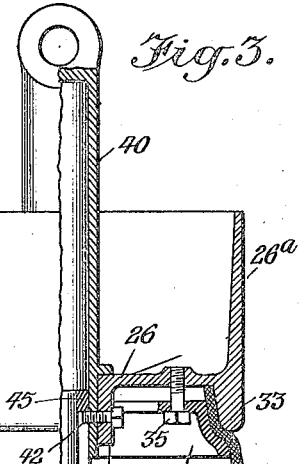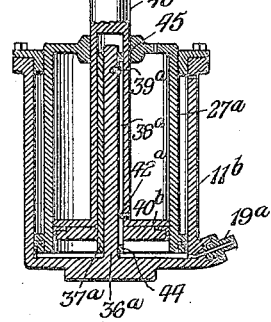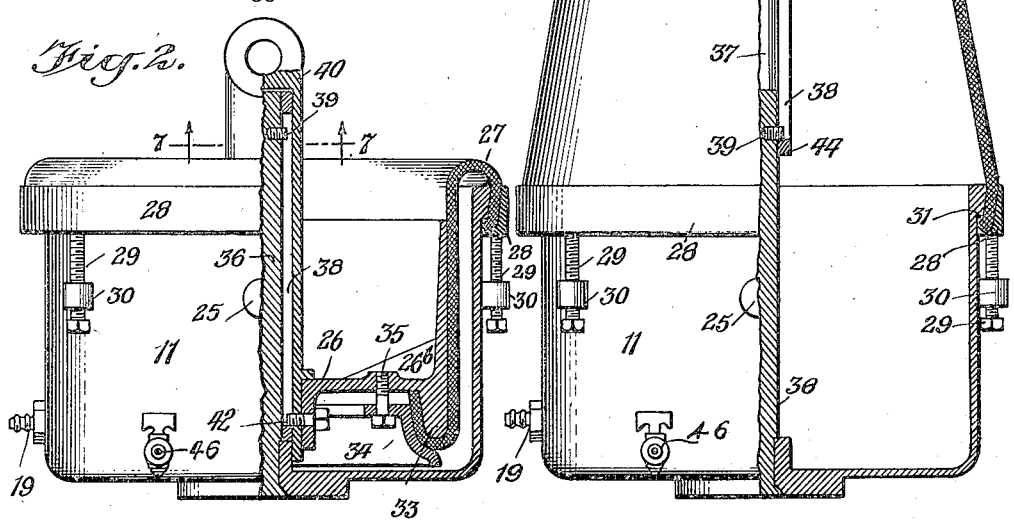

UNITED STATES PATENT OFFICE.

GREGORY J. SPOHRER, OF EAST ORANGE, NEW JERSEY.

VEHICLE DUMPING AND JACKING MEANS.

1,414,835.  Specification of Letters Patent.  Patented May 2, 1922.

Application filed August 24, 1920. Serial No. 405,622.

*To all whom it may concern:*

Be it known that I, GREGORY J. SPOHRER, a citizen of the United States, and a resident of East Orange, in the county of Essex and State of New Jersey, have invented a new and Improved Vehicle Dumping and Jacking Means, of which the following is a description.

My invention is intended more particularly for use on automobile trucks having dumping bodies, an object being to provide a dumping means improved in various important particulars and having distinctive characteristics as will appear, and further to provide a body raising and lowering means that will be independent of the limitations presented by the chassis and by the drive means and other elements appurtenant to the chassis.

A further object is to minimize the dead weight load and maximize the capacity of the truck for freight load.

An important object also is to provide for installing an extensible body-lifting unit in the limited space available between the planes of the bottom of the truck body and the chassis.

A further object of my invention is to provide an expansible cylinder and appurtenances which while capable of a wider field of use is of especial importance in adapting the body raising installation to the inexorable conditions presented by truck construction. The distinctive cylinder and appurtenances involved in my invention lend themselves to embodiment in a jack, the whole making it possible to equip the truck with body lifting and jacking means, light and simple beyond anything possible with known installations and equipments and operable by the pressure from the pump used for tire inflating.

Reference is to be had to the accompanying drawings in which like reference characters indicate like parts in the several figures, it being understood that the drawings are merely illustrative of examples of structural forms reflecting the principles of my invention.

Figure 1 is a side elevation conventionally showing an automobile truck having a dumping body and a body hoisting and lowering means embodying my invention in its structure and in its co-ordination with a tire inflating pump;

Figure 2 is a partly sectional side elevation of a portion of an expansible unit formed in accordance with my invention for hoisting and lowering the truck body, the view showing the unit collapsed;

Figure 3 is a view similar to Figure 2 but showing the elements in extended form;

Figure 4 is a detail in longitudinal vertical section of a three-way valve to be hereinafter referred to for directing air pressure from the tire pump to either the tire or to the body lifting means;

Figure 5 is a side elevation of a jack involving an extensible and collapsible unit of the form shown in Figures 2 and 3;

Figure 6 is a longitudinal vertical section of a modified form of the extensible and collapsible unit;

Figure 7 is a detail in horizontal section on the line 7—7, Figure 2.

In Figure 1 the letter A indicates the frame of a chassis of an automobile truck; B, the dumping body thereof hinged at the rear end; C, the seat structure; D, the transmission; E, a flange provided on the transmission at each side, the one flange being provided on the usual truck for the securing of an air pump, and the flange at the opposite side for power take-off. The letter F indicates a tire to be inflated; G, indicates an axle, and H, the shaft from transmission to differential.

In the illustrated assemblage of Figure 1 reflecting my invention, the numeral 10 indicates a form of tire pump invented by me and forming the subject matter of a co-pending application. The body raising and lowering unit includes a cylinder 11 which is arranged to receive air from the pump 10. The arrangement in the illustrated example comprises a discharge pipe 12 from the pump adapted to be connected with the inlet 13 of a three-way valve 14. From the casing of valve 14 leads a discharge nipple 15 for receiving a hose 16 to connect with the valve *f* of a tire to be inflated. A second discharge nipple 17 leads from the valve 14 and is adapted to be connected by a pipe or hose 18 with the inlet 19 of the fluid pressure cylinder 11. The turnable plug 20 of the valve 14 presents a diametric fluid passage 21 as well as a passage 22 leading at right angles from the passage 21 to the periphery of the plug. By turning the plug 20 by the valve handle 23, the passage 21 may be made to connect the inlet nipple 13 with the discharge nipple 17 leading to the pressure cylinder 11 as shown in full lines, Figure 4. On the other hand a quarter turn of the handle will dispose the passage 21 at right angles to the full line position with one end communicating with the discharge nipple 15 for inflating the tire, the lateral passage 22 at this time registering with the inlet nipple 13 and the discharge nipple 17 to the cylinder 11 being closed.

The pressure cylinder 11 is suitably mounted on the chassis and positioned at the approximate longitudinal medial line when one cylinder only is employed for raising the body, the one cylinder being sufficient in practice. The cylinder is supported in the illustrated form by brackets 24 on the chassis affording bearings for trunnions 25 on the cylinder.

The cylinder 11 pertains to a ram which when co-ordinated with the tire pump 10, as in the installation illustrated in Figure 1 is adapted to form an air column for raising and lowering the body B. The ram in addition to including the cylinder 11 as a base includes a suitable head 26 which will vary with the service for which the ram is designed, said head being adapted to telescope within the cylinder 11 in the collapsed form of the ram and to be projected beyond the cylinder in the extended form of the ram. In accordance with my invention the head 26 is connected with the cylinder 11 by a flexible cylinder section 27 which in practice is formed from tubular fabric and rubber, although it may be formed of other flexible material. The flexible tubular section 27 is secured to the cylinder 11 at the top and to the head 26 at the periphery and it is adapted to fold into itself in the collapsed form of the ram and to roll inward and outward in the collapsing and extension of the ram. In the illustrated form the lower edge of the tubular section 27 is clamped against an annular shoulder 31 on the cylinder 11 at the top by means of an exterior clamp ring 28, said ring being forced into clamping engagement by a series of screws 29 operating in internally threaded lugs 30 rigid with the cylinder 11 at the exterior. At the upper end the tubular section 27 is shown as received within an annular depending flange 33 on the head 26 and it is clamped against said flange by an internal flaring angle ring 34 secured beneath the under side of head 26 as by bolts 35. Owing to the cylinder 11 being of greater diameter than the head 26 the flexible tubular section 27 at the top is made of less diameter than the lower end of said section so that in the extended form of the ram the section 27 will taper upwardly. It will be apparent that the taper may in practice be such as may be required to enable the inturning and outturning of said section while at the same time, said tubular section may be made of sufficient strength to withstand the pressure in forming the air column when the ram is extended under the pressure of the air pump 10. The head 26 is formed with a cylindric flange $26^a$ in order to maintain the form of the flexible section 27 in collapsing and extending.

The rule with respect to telescoping cylindric elements is that that one sliding relatively to the other must have a contact with the other section over a length at least equal to the diameter of the sliding section in order to prevent tilting and binding when telescoping. Inasmuch as the head 26 with its annular flange $26^a$ is materially smaller in diameter than the cylinder 11 and out of guiding contact therewith, I provide telescoping guide means which observes the stated rule. In producing the telescoping guide means, in the form illustrated, a central post 36 rigid at its lower end with the cylinder rises in said cylinder and above the top thereof and a tubular telescoping element 37 is sleeved on the post 36 and has a vertical slot 38 therein accommodating a stop 39 which protrudes laterally from the post 36 near the upper end. Said stop may, as shown, be in the form of a stud threaded into an aperture in the post 36. An element 40 telescopes the tubular element 37 and it constitutes the member for connecting the ram with the truck body B in the assemblage of Figure 1 or otherwise applies the thrust of the ram as in a jack for example as will appear. The connection of thrust element 40 with the truck body B is a pivotal one as at 41 and this with the trunnion support of the cylinder 11 permits of the lifting unit conforming itself to the changing angle of the body. In the outward movement of the head 26 a stop 42 thereon, which extends laterally into the slot 38 of tubular element 37, engages said element 37 at the upper closed end 45 thereof and carries said element 37 outwardly. The lower closed end 44 of tubular element 37 at the limit of its outward movement engages the stop 39. The stop 42 is shown as a machine screw extending through an annular flange 43 on head 26 and through the lower end of thrust element 40.

In Figure 6 the described guide means is shown associated with rigid telescoping cylinder sections, there being a base cylinder section $11^b$ having a fluid inlet $19^a$, the rigid cylinder section $27^a$ telescoping therein, and plunger $40^b$ provided with an element $40^a$ corresponding with the element 40. The guide means includes a post $36^a$ with tubular element $37^a$ thereon slotted as at $38^a$ on which tubular element the plunger $40^b$ and thrust element $40^a$ slide. Stops $39^a$ and $42^a$ correspond with the stops 39 and 42.

By employing telescoping guide means as described the construction of the telescoping sections is not confined to any linear contact of the telescoping sections in order to prevent tilting and binding. Moreover, in the form shown in Figures 2 and 3, the flexible section 27 extends beyond the linear dimension of its collapsed form, the straightening out of the flexible section serving to take up the fullness of material at the bends. This factors largely in the production of a lift unit that will conform to the restricted space conditions and be effective in extending from the collapsed condition to a degree to tilt the dumping body beyond the angle of repose of its contents and at the same time the location of the lifting unit and its connection with the body are in accordance with a desirable leverage point on the body. It will be readily understood from the foregoing that factoring in the compactness of the total assemblage comprising the lift unit and the air pump unit as well as the lightness thereof, is not only the stated utilization of the air pump as a source of power but also the fact that I provide thereby an arrangement in which, although the extensible lift unit may be freely located at any advantageous point along the chassis necessarily laterally inward from the chassis frame, the pump unit does not encroach on the region of the drive and other elements crowding the space within the chassis frame.

In Figure 5 a jack is shown corresponding in all respects with the lift unit shown in Figures 2 and 3 with the exception that the thrust element 40$^b$ is shown with a jack head 40$^c$ affording a concave seat for an axle conventionally indicated at G. The cylinder 11 of Figures 2, 3 and 6 has an air cock 46 and in exhausting the air to relieve the pressure for the collapsing of the unit, either the air cock 46 or the valve 14 may be utilized as will be obvious. In exhausting through the valve 14 the plug 20 thereon will be turned to present the passage 22 to the pipe 18 so that the fluid exhausts through said passage 22 and the passage 21 to the discharge outlet 15, thereby exhausting to the atmosphere, it being understood that the hose 16 is not attached to discharge outlet 15 at this time.

The tire pump 10 as such is employed in the assemblage of Figure 1 to factor in carrying out the purpose of providing an extensible unit independent of the pump and disposed beneath the dumping body and above the plane of that shaft of the drive extending longitudinally from the transmission to the differential or above drive means the equivalent of said shaft.

With the hydraulic power unit as well as with the air pressure unit, the extensible unit is accommodated in the collapsed form beneath the body and in the space above the plane of the longitudinal drive shaft referred to.

I would state in conclusion that while the illustrated examples constitute practical embodiments of my invention, I do not limit myself strictly to the mechanical details herein illustrated, since manifestly the same can be considerably varied without departure from the spirit of the invention as defined in the appended claims.

Having thus described my invention, I claim:

1. A fluid operated extensible and collapsible unit including a cylinder, a head adapted to be actuated by the fluid pressure in the cylinder to move into and out of the same, and flexible fluid-tight connecting means between said cylinder and said head and subject to the fluid pressure to unfold into extended form beyond the cylinder, or to collapse into the cylinder, with the movements of said head.

2. A fluid operated extensible and collapsible unit including a cylinder, a head adapted to be actuated by the fluid pressure in the cylinder to move relatively to and beyond the cylinder for extending the unit, and flexible fluid-tight connecting means between said cylinder and head.

3. A fluid operated extensible and collapsible unit including a cylinder, a head adapted to be actuated by the fluid pressure in the cylinder to move into or out of the cylinder in the collapsing and extending of the unit, and a flexible tubular section between said cylinder and said head and adapted to fold into or out of the cylinder with the collapsing or extension movement of said head.

4. A fluid operated extensible and collapsible unit including a cylinder, a head adapted to be actuated by the fluid pressure in the cylinder and movable under the pressure relatively to the cylinder with the extending and collapsing of the unit, and flexible connecting means between said cylinder and head to form therewith a fluid pressure column, said connecting means being extensible with the head beyond the cylinder.

5. A fluid operated extensible and collapsible unit including a cylinder, a head adapted to be actuated by the fluid pressure in the cylinder and movable under the pressure relatively to the cylinder with the extending and collapsing of the unit, and a flexible cylindrical wall connected at its ends respectively with said cylinder and head to extend under the pressure beyond the cylinder and to collapse in the absence of pressure into said cylinder.

6. A fluid-operated extensible and collapsible unit including a cylinder, a head adapted to be actuated by the fluid pressure in the cylinder and having a diameter less than the cylinder to be free of the latter and provide a space between the head and cylinder in the collapsed form of the unit, and a tubular flexible connection between said cylinder and head, and tapering toward said head to roll for folding within itself or unfolding with the movements of said head to an extended position beyond the cylinder or collapsed within the cylinder.

7. A fluid operated extensible and collapsible unit including a cylinder, a head adapted to be actuated by the fluid pressure in the cylinder and having a diameter less than the cylinder to be free of the latter and provide a space between the head and cylinder in the collapsed form of the unit, and a tubular flexible connection between said cylinder and head and adapted to fold within itself and into the cylinder or to unfold with the movements of said head to a position beyond the cylinder.

8. A fluid operated extensible unit including a cylinder, and a thrust head adapted to be actuated by the fluid pressure in the cylinder to move into or beyond the latter, and flexible means establishing a fluid-tight connection between said cylinder and thrust head, said connecting means being adapted to individually assume an extended form beyond the cylinder to form a zone of the extended unit or a collapsed form of reduced linear dimension with the movements of said head.

9. A fluid operated extensible unit including a cylinder, and a thrust head adapted to be actuated by the fluid pressure in the cylinder to move into or beyond the latter, and means establishing a fluid-tight connection between said cylinder and thrust head, said connecting means being adapted to individually assume an extended form beyond the cylinder or a collapsed form of reduced linear dimension within the cylinder with the movements of said head.

10. A fluid-operated extensible unit including a plurality of sections, one of which is foldable and unfoldable on itself to collapse within the next section beneath or to extend beyond said section beneath.

11. A fluid-operated extensible unit including a plurality of sections, one of which is foldable and unfoldable on itself to collapse within the next section beneath or to extend beyond the said section, a thrust head, and means supporting the thrust head on the said foldable section and adapted to move with the unfolding of the latter to a position remote from said section beneath.

12. A fluid operated extensible and collapsible unit including a cylinder and a section foldable tubularly on itself in the collapsing of the unit to present a returned tubular form within the cylinder or to assume an extended form beyond the cylinder.

13. An extensible and collapsible unit comprising telescoping sections, telscoping guide elements on the respective sections, and an interposed telescoping guide element between the first-mentioned guide elements, said guide elements serving to maintain the alinement of said sections and being disposed within and distant from the walls of the sections.

14. A fluid-operated extensible unit including telescoping sections, and coacting guide elements on the respective sections, said guide elements being centrally disposed within the sections to maintain the alinement of the latter in telescoping, and being additional to and independent of the walls of the sections.

15. A fluid-operated extensible unit including telescoping sections and centrally positioned telescoping guide elements movable with the respective sections for maintaining the latter in alinement in their telescoping movements.

16. A fluid operated extensible unit including a cylinder, a thrust head adapted to be subjected to fluid pressure in the cylinder to move into or out of the latter, and an intermediate flexible tubular section therebetween; together with means to clamp said flexible section at one end to said cylinder, and means to clamp the opposite end of said flexible section to said head, the last mentioned means including a depending flange on the head, about which flange, the upper end of the flexible section is bent, and a clamp element within said flange for clamping said bent portion of the flexible section against said flange.

17. A fluid operated extensible unit including a rigid cylinder, a thrust head adapted to be subjected to fluid pressure in the cylinder to move into or out of the latter, and an intermediate flexible tubular cylinder section carrying said head and united to said cylinder to form a continuation thereof projecting beyond said rigid cylinder.

18. A fluid operated extensible unit including a cylinder, a thrust head adapted to be subjected to fluid pressure in the cylinder to move into or out of the latter, and an interminate flexible tubular section carrying said head and united to said cylinder to form a continuation thereof, said flexible section being convergent toward said head to freely move with the head into or out of said cylinder.

19. A pneumatic extensible and collapsible unit of the class described including a cylinder adapted to receive air under pressure, and extensible power-applying means subject to inflation by air pressure in said cylinder to extend beyond the latter and collapsible in the absence of the air pressure.

20. A pneumatic extensible and collapsible unit including an air pressure cylinder, inflatable means complementary to said cylinder and forming when inflated a continuation of the cylinder, and means subject to the inflation and collapsing of said first means, to utilize the pressure therein in applying power.

21. An extensible and collapsible unit of the class described including a fluid pressure cylinder, and flexible means subject to fluid pressure in the cylinder and extensible under said pressure to form a continuation of the cylinder; together with means associated with said flexible means to apply the power thereof in extending.

22. A fluid-operated extensible and collapsible unit including a cylinder, a head adapted to be actuated by the fluid pressure in the cylinder to move relatively to the cylinder and form an extension thereof, and flexible fluid-tight connecting means between said cylinder and head; together with guide means for the head in its movements relatively to the cylinder, said guide means being additional to said head and cylinder.

23. A fluid-operated extensible unit including telescopically related sections, a flexible section extensible beyond the next rearward section or collapsible from said extended position to conform to the movements of the first-mentioned sections, and guide means for said first-mentioned sections additional to the telescopic correlation thereof.

24. A fluid-operated extensible unit including telescopically related sections, a flexible section extensible beyond the next rearward section or collapsible from said extended position to conform to the movements of the first-mentioned sections, and guide means for said first-mentioned sections additional to the telescopic correlation thereof, said guide means being disposed centrally of the sections.

25. A fluid-operated extensible unit including telescopically related sections, a flexible section connecting the first-mentioned sections and adapted to conform to the movements thereof, and telescoping guide elements mounted to move with the telescoping movements of the first-mentioned sections.

GREGORY J. SPOHRER.